United States Patent [19]

Sugihara et al.

[11] Patent Number: 4,590,346
[45] Date of Patent: * May 20, 1986

[54] METHOD OF HEATING PIPING ARRANGEMENT AND HEATING COIL

[75] Inventors: Isao Sugihara; Tsukasa Ikegami, both of Hitachi, Japan

[73] Assignee: Hitachi, Ltd., Tokyo, Japan

[*] Notice: The portion of the term of this patent subsequent to Mar. 19, 2002 has been disclaimed.

[21] Appl. No.: 483,536

[22] Filed: Apr. 11, 1983

[30] Foreign Application Priority Data

Apr. 30, 1982 [JP] Japan ................................. 57-71144

[51] Int. Cl.$^4$ ............................................ H05B 6/40
[52] U.S. Cl. ............................ 219/10.43; 219/8.5; 219/10.57; 219/10.79; 148/145; 148/154; 266/129
[58] Field of Search ................. 219/8.5, 9.5, 10.43, 219/10.41, 10.57, 10.79, 10.75, 10.49 R; 148/145, 146, 150, 154, 127; 266/129

[56] References Cited

U.S. PATENT DOCUMENTS

| 2,182,819 | 12/1939 | Pisarev | 219/10.79 X |
| 2,352,332 | 6/1944 | Limpel | 219/10.79 X |
| 2,692,322 | 10/1954 | Bennett | 219/8.5 |
| 2,706,234 | 4/1955 | Macy | 219/10.79 X |
| 3,230,337 | 1/1966 | Viart | 219/9.5 |
| 3,827,275 | 8/1974 | Suttan et al. | 219/10.79 X |
| 4,012,616 | 3/1977 | Zelahy | 219/9.5 |
| 4,505,763 | 3/1985 | Sugihara et al. | 219/10.79 X |

FOREIGN PATENT DOCUMENTS

| 42-10058 | 5/1967 | Japan | 219/8.5 |
| 53-38246 | 10/1978 | Japan | 219/8.5 |
| 58-9786 | 1/1983 | Japan | 219/8.5 |
| 829689 | 5/1981 | U.S.S.R. | 219/8.5 |

Primary Examiner—Philip H. Leung
Attorney, Agent, or Firm—Beall Law Offices

[57] ABSTRACT

The invention relates to a method of heating a piping arrangement and a heating coil used in the heating process by heating pipes through a high frequency wave induction. A spacing between the pipe outer surface and the heating coil is varied in compliance with a change in configuration of the heating coil. According to the invention, even if the coil configuration is particularly changed, it is possible to heat the pipes uniformly to obtain a uniform temperature distribution.

13 Claims, 20 Drawing Figures

DISTANCE FROM STEPPED PORTION (mm)

METHOD OF HEATING PIPING ARRANGEMENT AND HEATING COIL

BACKGROUND OF THE INVENTION (1) Field of the Invention

The present invention relates to a method of heating a piping arrangement in which a pipe is heated through a high frequency wave induction and a heating coil to be used for the heating process, and more particularly, to a method of heating a piping arrangement and a heating coil which are applicable to the case where a configuration of the heating coil is sharply changed in such case that the heating coil is provided with stepped portions or there is a welded portion between a primary pipe and a pipe base at which the piping arrangement is greatly changed in cross section.

(2) Description of the Prior Art

In a piping arrangement for use with atomic plants, thermal plants, chemical plants and the like, pipes such as a straight pipe, a curved pipe, and other pipes are welded to each other to form a long piping. However, recently, for instance, an atomic plant has been used at a higher temperature and a higher pressure. Therefore, there is a great fear that a stress generated in such a piping would approach a yield stress of the material. Also, pipes are manufactured through plasticity machining and a welding technique is applied to the pipes to form a piping arrangement. A residual tension stress generated in the piping arrangement through such processes will be amplified with a repeated stress, which is generated upon operating the plant, e.g., a repeated thermal stress. In particular, when corrosive fluid is made to flow in the pipe, a corrosion fatigue must be considered. To prevent a stress-corrosion cracking in such a piping arrangement, the Japanese Patent Application Laid-Open No. 38246/78 discloses a heat processing method for pipe arrangement, in which coolant is provided in the pipe, the pipe is heated to thereby generate a difference in temperature between an outer surface and an inner surface of the pipe, and the inner surface is subjected to a yield tension stress whereas the outer surface is subjected to a yield compression stress. In that thermal processing method, under the condition that coolant, for instance, cooling water for a nuclear reactor in the case of the atomic energy plant be supplied in the pipe, a heating coil is wound on the outer surface of the pipe in the vicinity of the welded portion of the pipe. A magnetic field is generated by the application of current to the coil. The outer periphery of the pipe is then heated but the interior of the pipe is not so heated at a high temperature because of the coolant. As a result, a difference in temperature exists between the outer and inner surfaces of the pipe. It is preferable that the extent of such a temperature difference be such that during heating, compression yield is applied to the outer surface whereas tension yield is applied to the inner surface. Thus, when the heat processing is finished, the temperature of the pipe is gradually decreased so that as reversed to the phenomenon upon heating, the outer surface of the pipe is subjected to a residual tension stress whereas the inner surface thereof is subjected to a residual compression stress. Since the inner surface is improved by the compression stress thereby removing a cause of the stress-corrosion cracking, a resistance of the pipe against the corrosive fatigue is remarkably enhanced. Namely, in the atomic energy plant, the pipe may withstand a repeated thermal stress generated by the flow of cooling water through the pipe during the operation of the nuclear reactor, and a stress-corrosion cracking of the pipe may be prevented even under the existence of corrosive fluid.

Although such a heat processing method may be applied to pipe arrangements of various plants, there is a maximum temperature limit below which the heating is possible. For example, in case of stainless steel used in the atomic energy plant, the allowable maximum temperature for the outer surface of the pipe is approximately 550° C. due to a sensitivity problem in excess accompanying the heating. In order to generate a yield compression stress on the outer surface of the pipe and a yield tension stress on the inner surface thereof within the upper limit, an important task to be solved is how the upper limit of the heating temperature is suppressed while keeping a necessary temperature difference large. To meet this requirement, it is necessary to keep the temperature possibly uniform in the pipe outer surface under the influence of the heating coil, without such localization of temperature that some parts are extremely heated and other parts remain at an extremely low temperature.

In the case where the configuration of the coil is simple, when the outer surface of the pipe is heated by the heating coil, a uniform temperature distribution may readily be obtained on the basis of a theory. However, if the configuration of the coil is complicated, a magnetic flux distribution generated by current flowing through the coil is changed so that it results in nonuniform distribution of temperature.

As an example in which nonuniform distribution in temperature is caused, the magnetic flux distribution is changed by the provision of stepped portions in the coil. A coil to be used for induction heating of the pipe has a large diameter. Moreover, it is very difficult to wind it in a spiral manner in a particular shape thereof in cross section. For this reason, one turn of the coil is included in substantially the same plane, and both the turn ends are bent in the opposite direction at a predetermined angle, respectively, and are connected to the adjacent turn ends thereby forming a single coil as a whole. The connecting portion of each adjacent two ends of the turns will be referred to as the stepped portion, which is different in magnetic flux than other portions. Therefore, the outer surface of the pipe confronted with the stepped portion is a place where it is difficult to increase a temperature.

As another example in which nonuniform distribution in temperature is caused, the configuration of the coil is complicated in the vicinity of a welded portion against a pipe base. More specifically, to couple a branched pipe or a nozzle to a primary pipe with the branched pipe or the nozzle being perpendicular to the primary pipe, this makes the piping arrangement per se complicated, as a result of which the coil configuration becomes complicated. Also in this case, a portion where a temperature is increased with difficulty will be generated by the variation in magnetic flux distribution.

SUMMARY OF THE INVENTION

An object of the present invention is to provide a method of heating a piping arrangement and a heating coil used in the method, in which a uniform temperature distribution of a pipe is obtained even if a configuration of the pipe or the heating coil is particularly changed.

According to the invention, in a method of heating a piping arrangement for preventing stress-corrosion cracking at a welded portion of the piping arrangement by providing a pipe with coolant and heating an outer surface of the pipe by a heating coil, thereby generating a temperature difference between an inner surface and the outer surface of the pipe, there is provided a method of heating the piping arrangement comprising a step of varying a spacing defined between the outer surface of the pipe and the heating coil in compliance with a change in configuration of the heating coil to be attached to the piping arrangement. Furthermore, if the heating coil has stepped portions, the spacing between the coil at the stepped portions and the pipe outer surface is made smaller than that of other portions. Also, the spacing between the coil and the pipe outer surface at a portion such as a pipe base welded portion where the configuration of the piping arrangement is complicated and hence a magnetic flux density generated by the heating coil is smaller, is made smaller than a spacing in the vicinity thereof. As a method for varying a spacing between the coil and the pipe outer surface, there are provided various methods in which a welded material is formed on the inside of the coil confronted with the pipe outer surface, a conductive member is attached thereto, the coil is in the form of an ellipse, the coil is eccentrically provided with respect to the piping while the configuration of the coil remains unchanged along the pipe form and an external force is applied to the coil to thereby forcibly deform the coil.

According to another aspect of the invention, in a heating coil for use in a piping arrangement for being provided therein with coolant, heating an outer surface of a pipe to thereby generate a temperature difference between the outer surface and an inner surface of the pipe, and preventing stress-corrosion cracking at a welded portion of the pipe, there is provided a heating coil comprising an improvement wherein the heating coil is provided with stepped portions in the midway thereof and is wound along the welded portion, and a spacing between the coil and the outer surface of the pipe is smaller at the stepped portions than at the other coil portions.

Other objects features and advantages of the present invention will be more apparent from the following descriptions with reference to the accompanying drawings.

DESCRIPTION OF THE PREFERRED EMBODIMENTS

Figure 1:
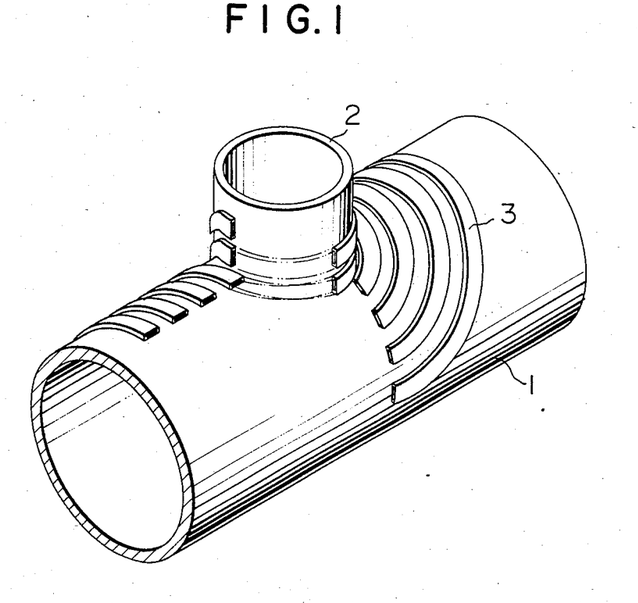
FIG. 1 is a perspective view showing a state in which a general heating coil is wound on pipes when a piping arrangement is heated through a high frequency wave induction.

A heat treatment of pipes through a high frequency wave induction heating will be explained with reference to FIG. 1 before explanations of specific embodiments of the present invention. In FIG. 1, a pipe base 2 is coupled, by welding, to a primary pipe 1 so as to intersect therewith. A heating coil 3 is wound around the welded portion of the primary pipe 1 and the pipe base 2. In order to obtain substantially a uniform temperature distribution on the surfaces of the primary pipe 1 and the pipe base 2, in particular, to keep the welded portion at a uniform temperature, it is desirable to wind the heating coil 3 in parallel to the welding line. Therefore, the coil 3 is provided not to be wound around the axis of the primary pipe 1 but to be wound around the axis of the pipe base 2 also in the primary pipe region. The configuration, in cross section, of the coil 3 may be selected from any of rectangular, circular, oblong shapes and the like but a hollow construction is desirable. In order to allow a great amount of high frequency current to flow through the coil 3, it is necessary to cool the coil 3 per se. In the case where the hollow coil 3 is used and a cooling water is made to flow therethrough, the overheating of the coil 3 is prevented.

Figure 2:
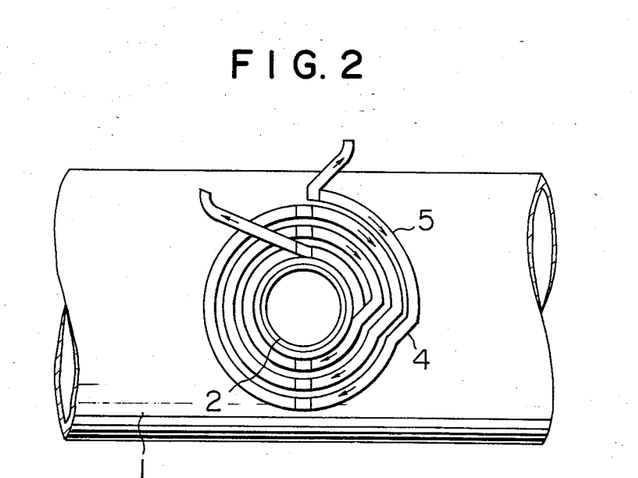
FIG. 2 is an illustration showing a high frequency wave heating induction coil which is wound around a welded portion of a primary pipe and a pipe base and is provided with stepped portions.

Embodiments of the invention will now be described with reference to the accompanying drawings. FIG. 2 shows a high frequency wave induction heating coil 5 wound along with the welded portion of the primary pipe 1 and the pipe base 2 and provided with stepped portions 4. As described before, in the stepped portion 4, the direction of flow of the current is abruptly changed at a portion where a certain turn of the coil 5 is physically changed to the adjacent turn thereof. A cooling water is made to flow through the coil 5. When a current is made to flow through the coil 5 as shown by the arrow, a magnetic flux density is reduced so that it is difficult to increase the temperature.

Figure 3:
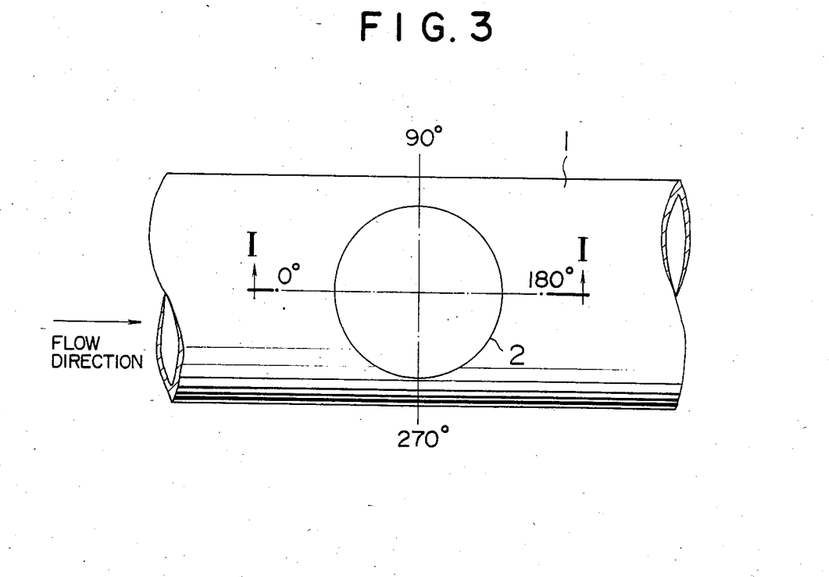
FIG. 3 is a schematic view of the welded portion for illustrating angles with reference to a flow direction of fluid in the pipe.
Figure 4:
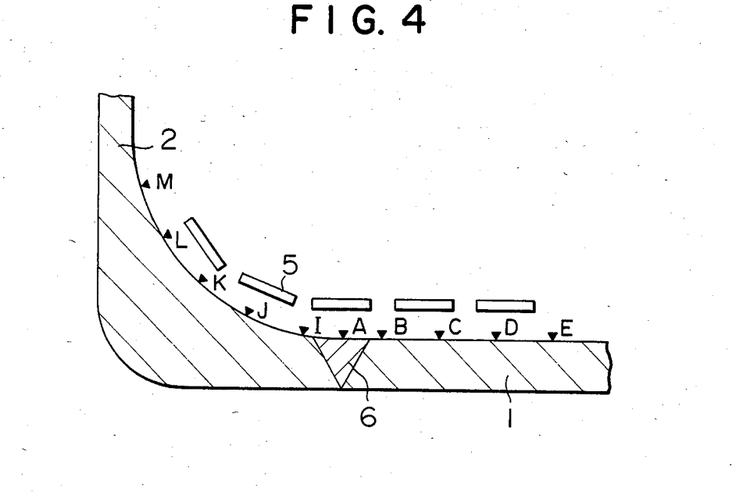
FIG. 4 is a cross-sectional view of half the region taken along the line I—I of FIG. 3.
Figure 5:
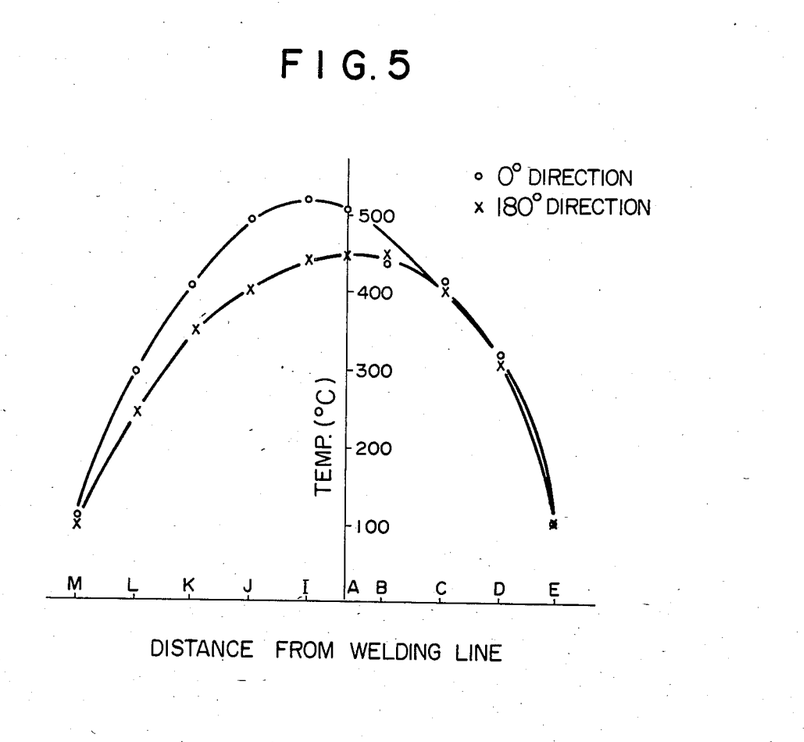
FIG. 5 is a graph showing the temperature distribution at the respective points shown in FIG. 4.

Differences in temperature distribution according to locations of the stepped portions will be explained. Let us assume that in FIG. 3, a direction which is a counter direction against a flow direcotion of fluid flowing through the primary pipe 1 be defined by an angle of 0° and the flow direction of fluid be defined by an angle of 180°. FIG. 4 shows half the cross-sectional view taken along the line I—I of FIG. 3. The heating coil 5 is wound around a welding portion 6 of the primary pipe 1 and the pipe base 2. A temperature at each of points A, B, C, D, E, I, J, K, L, and M was measured in each of directions 0° and 180° under the condition that fluid was made to flow in the primary pipe 1 while a high frequency induction heat was being applied thereto. In this case, the stepped portions were provided on the 180° direction side. The results are shown in FIG. 5. Since the respective points in the 0° direction and the 180° direction correspond to each other, the same position is indicated by the same reference character. In FIG. 5, a sign o indicates a temperature at each point in the 0° direction and a sign x indicates a temperature at each point in the 180° direction where the stepped portions are provided. As has been understood from FIG. 5, a temperature difference at each point in the 180° direction is smaller than that at each point in the 0° direction. This means that a certain measure is required to cause the temperatures on the 180° side, in which the stepped portions are provided, to approach the temperatures on the 0° side, because the temperature distribution generated by the heating coil on the 0° and 180° sides is desired to be possibly uniform.

As explained with reference to FIGS. 2 through 5, due to the fact that in the heating coil, there are provided the stepped portion or the stepped portion location is in particular positional relationship to the flowing manner of fluid in the pipe and to the pipe construction, it will be understood that if spacings between the coil and the pipe are kept constant anywhere, a difference in temperature distribution is caused. It is an essential principle of the invention that when a heating coil is wound around a piping surface, spacings between the coil and the pipe are varied at each portions, whereby nonuniformity of the temperature distribution on the piping surface under the effect of the coil is eliminated and the piping surface is uniformly heated. It is therefore possible to obtain a temperature difference large enough to achieve a compression yield at the outer surface of the pipe and a tension yield at the inner surface thereof.

Figure 6:
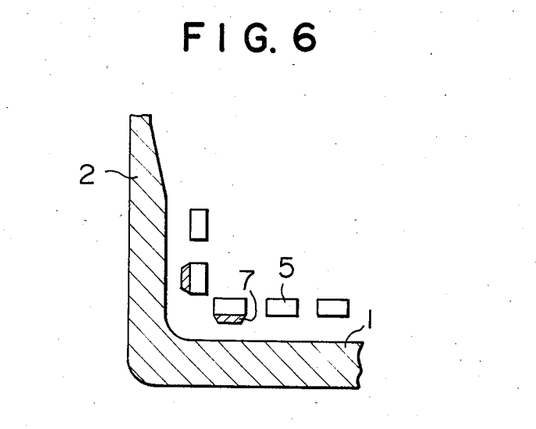
FIG. 6 is a cross-sectional view showing one embodiment of the invention in which conductive members are attached to or welded materials are formed on the inside of the coil.
Figure 7:
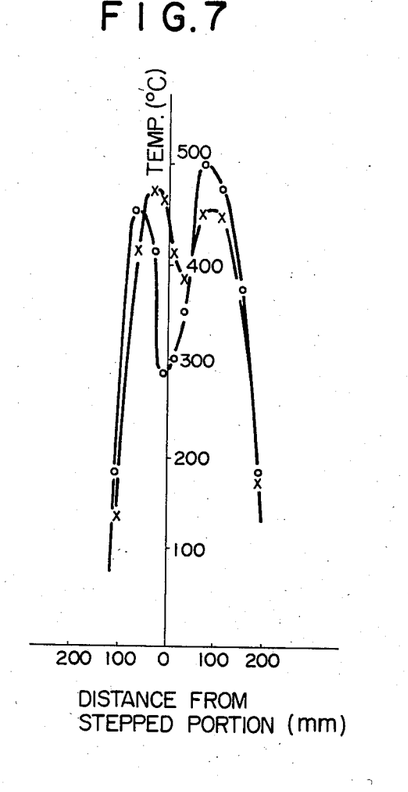
FIG. 7 is a graph showing the comparison of the case where the conductive members are attached to or welded materials are formed on the inside of the coil as shown in FIG. 6, with the case where no members or materials are provided, in temperature distribution.

A specific embodiment of the invention will now be described with reference to FIG. 6, in which in stepped portions of a heating coil 5, there are provided, inside, conductive members attached through brazing such as silver-soldering or conductive materials integrally welded thereon as indicated at reference numeral 7. The conductive members or welded materials 7 suffice if they have a function to reduce the spacing between the coil 5 and the outer surface of the pipe. Thus, by forming the conductive members or welded materials 7 on the inside of the coil 5, the spacings between the portions, corresponding to the stepped portion 4, of the coil 5 and the outer surface of the pipe may be arbitrarily changed. As a result, a difficulty in increasing the pipe outer surface temperature at the stepped portion may be eliminated. FIG. 7 is a graph showing a difference in temperature distribution between the cases where as shown in FIG. 6, the conductive members or welded materials 7 are provided and neither conductive members nor materials are provided. The abscissa of the graph of FIG. 7 represents a distance from the center of the stepped portion to the primary pipe 1 side or pipe base 2 side, whereas the ordinate thereof represents a temperature, the graph showing the temperature distribution. As is apparent from the graph, a temperature drop at the stepped portion in the case where the conductive members or welded materials 7 are provided (indicated by the sign x) is smaller than that in the case where neither conductive members nor welded materials are provided (indicated by the sign o. This means that according to the present invention, the temperature distribution in the outer surface of the pipe to be heated by the coil 5 may be kept substantially uniform. As a result, a sufficient temperature difference between the outer and inner surfaces of the pipe may be maintained while suppressing the maximum temperature at the outer surface of the pipe.

Figure 8:
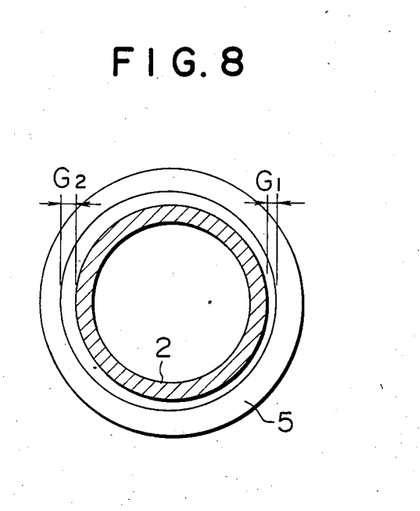
FIG. 8 is an illustration of another embodiment of the invention in which the coil is eccentrically provided with respect to the pipe base.
Figure 9:
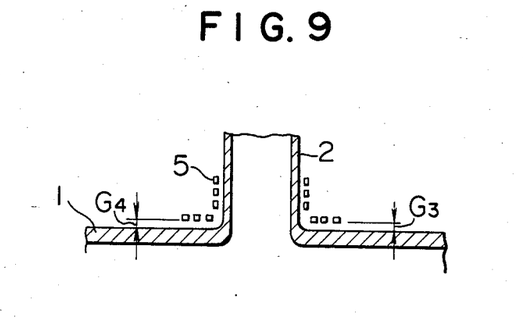
FIG. 9 is an illustration, similar to FIG. 8, of still another embodiment in which an external force is applied to the coil to thereby deform the coil.

FIGS. 8 and 9 show other embodiments of the invention in which the coil is provided with stepped portions. FIG. 8 shows an embodiment in which a center of the coil 5 is eccentrically provided with respect to the center axis of the pipe base 2. With such an arrangement, a spacing $G_1$ defined between the coil 5 having the stepped portion and the pipe base 2 is made smaller than a spacing $G_2$ at the other portions. FIG. 9 shows an embodiment in which the coil 5 is forcibly deformed by applying an external force to the coil 5 so that a spacing $G_3$ defined between the coil 5 having the stepped portion and the primary pipe 1 is made smaller than a spacing $G_4$ at the other portions. In FIG. 9, substantially the same effect as in the embodiment shown in FIG. 8 may be obtained.

Figure 10:
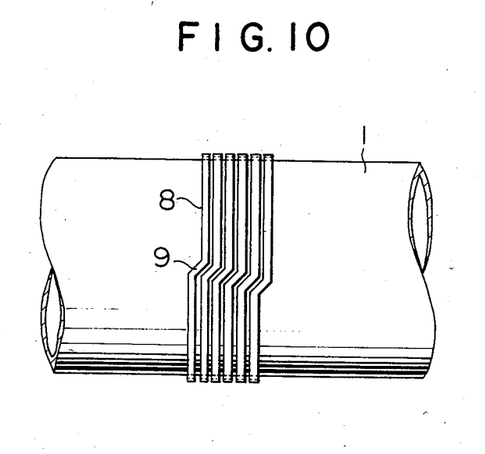
FIG. 10 is an illustration for illustrating the stepped portions of the heating coil wound on a straight pipe.

FIG. 10 shows an embodiment in which stepped portions on a straight pipe, i.e., welded portions of a primary pipe 1 is heated through high frequency induction. A heating coil 8 is provided with the stepped portions 9 for connecting one turn to the adjacent turn. Also at the stepped portions 9 of the straight pipe, as described before, it is difficult to increase a temperature of the outer surface of the pipe. In this case, the spacings between the coil at the stepped portions and the pipe may be made smaller than the spacings at the other portions by using any method in which as shown in FIG. 6, the conductive members or welded materials are formed on the inside of the coil 5 at the stepped portions; as shown in FIG. 8, the coil 5 is eccentrically provided with respect to the pipe; or as shown in FIG. 9, the coil per se is forcibly deformed by the external pressure. In particular, in the case of the straight pipe shown in FIG. 10, the coil 5 is moved along with the pipe while keeping a constant relationship between the coil and the pipe, and the coil may be used for heating other portions of the same pipe.

In the foregoing embodiments, the invention is applied to the stepped portions of the heating coil. Subsequently, explanation will be made as to the case where the pipe base is welded to the primary pipe and the invention is applied to the welded portion. As described above, when the pipe base is welded to the primary pipe in order to connect a nozzle or a branched pipe to the primary pipe, the construction of the pipes and the welded portions are complicated and also the configuration of the heating coil which is to be attached onto the pipe surface so as to mainly cover the welded portions is complicated.

Figure 11:
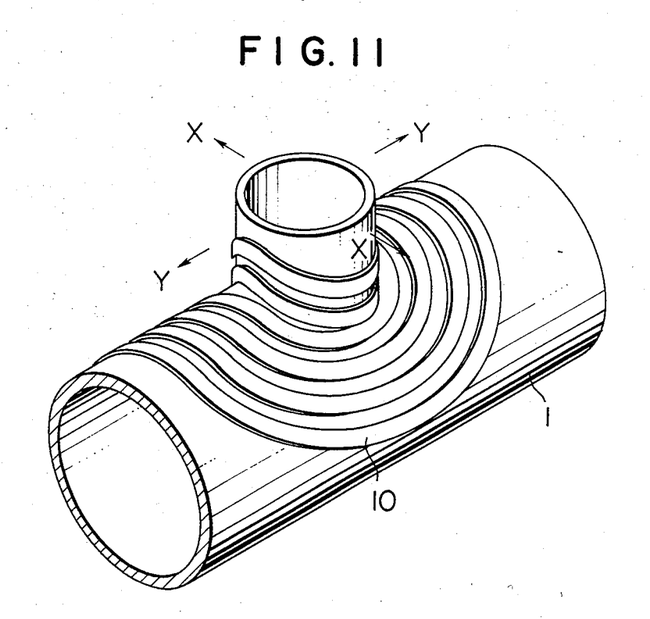
FIG. 11 is a perspective view showing a state in which the heating coil is wound around the welded portion when the pipe base is welded to the primary pipe.
Figure 12:
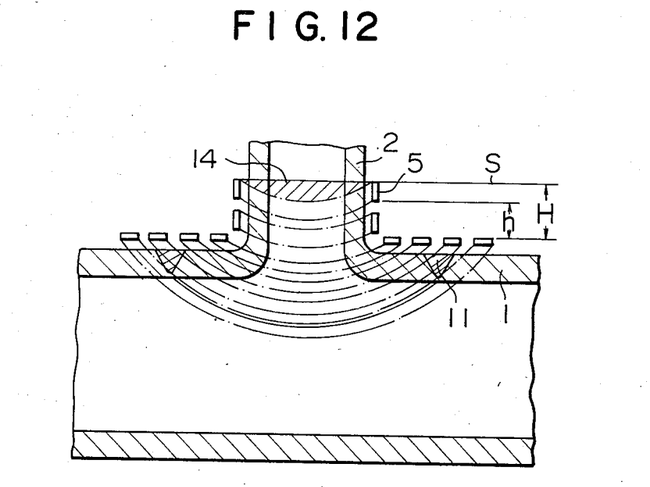
FIG. 12 is a cross-sectional view taken along the plane including the axes of the primary pipe and the pipe base in FIG. 11.

FIG. 11 shows an embodiment in which a pipe base 2 which is used for connecting a branched pipe to a primary pipe 1 is welded to the primary pipe so as to intersect therewith, and then a heating coil 10 is wound in order to heat the welded portion through high frequency induction. In particular, in the heating coil 10 shown in FIG. 11, a coil portion around the primary pipe 1 and a coil portion around the pipe base 2 are both in parallel to the welding line. Namely, the welding line cannot be defined by a two-dimensional plane but is curved in a three-dimensional manner. Accordingly, the portion, around the pipe base 2, of the coil 10 is desirably curved in parallel with the welding line in view of uniform heating. FIG. 12 shows a cross section taken along a plane including an axis of the primary pipe 1 and an axis of the pipe base 2 shown in FIG. 11. In FIG. 12, since the coil 5 around the pipe base 2 is wound in parallel to the welding line 11, a width of coil heating in the Y-direction shown in FIG. 11 is indicated by H in FIG. 12 whereas a width of coil heating in the X-direction shown in FIG. 11 is indicated by only h. As a result, a difference, (H-h), in the coil heating width is caused according to the difference in circumferential positions of the pipe base 2. It is therefore noted that it is more difficult to raise a temperature in the X-direction by the difference, (H-h), than in the Y-direction with respect to a same reference line S, and hence the temperature distribution of the pipe outer surface is made nonuniform. The hatched portion 14 in FIG. 12 corresponds to the difference, (H-h), in the heating width.

Figure 13:
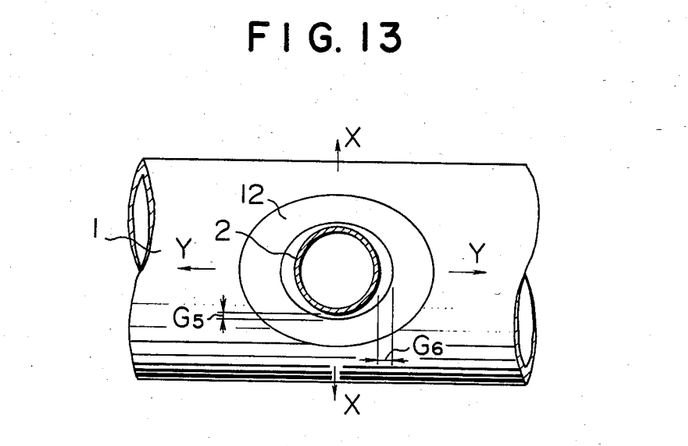
FIG. 13 is an illustration of an embodiment of the invention in which the coil is made into the form of an ellipse.

FIG. 13 shows an embodiment to which the invention is applied on the basis of the above-described studies. A coil 12 is wound to form an ellipse with a long axis thereof being aligned with the axial direction of the primary pipe 1 so that a spacing $G_5$, in the X-direction, between the coil 12 and the pipe base 2 is gradually smaller than a spacing $G_6$ in the Y-direction. Thus, essentially, the spacing, between the coil and the pipe outer surface, where a temperature is raised with difficulty by the coil, is narrower than any other spacing. Substantially the same effect may be obtained by using any measure in which the conductive members or welded materials are formed on the inside of the coil as shown in FIG. 6 or an external force is applied to particular portions thereof as shown in FIG. 9 in order to remove the nonuniformity in temperature distribution due to the heating width as explaned with reference to FIG. 12.

Figure 14:
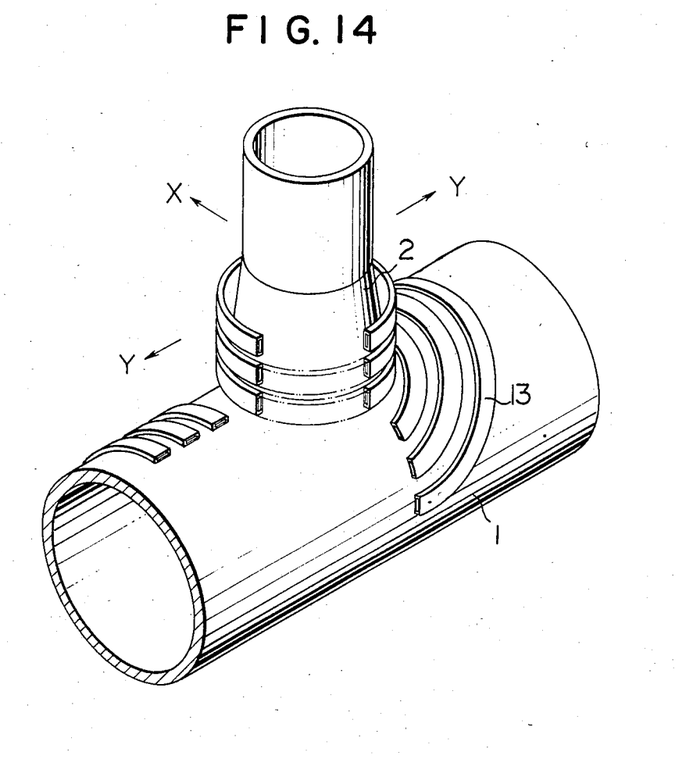
FIG. 14 is a perspective view showing a state in which when the pipe base is welded to the primary pipe, the coil is wound around the welded portion.
Figure 15:
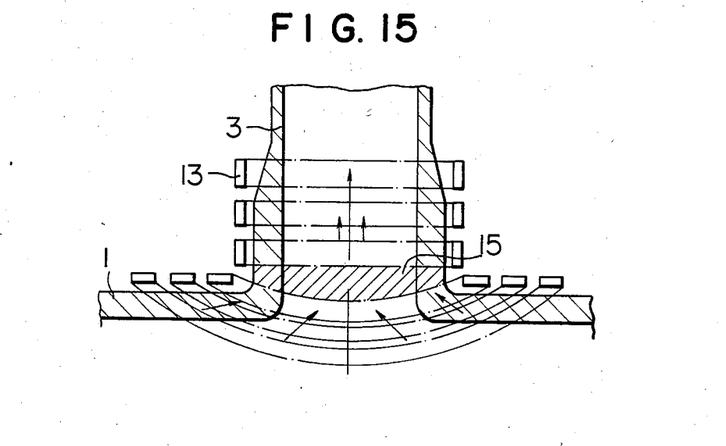
FIGS. 15 and 16 are cross-sectional views of FIG. 14.
Figure 16:
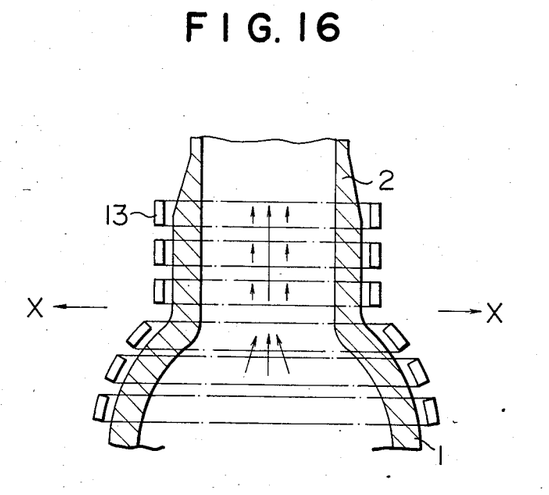

FIG. 14 shows an embodiment in which in the case where a pipe base 2 which is used for connecting a nozzle to a primary pipe 1 is welded to the primary pipe to intersect therewith, a heating coil 13 is wound in order to heat the welded portion through high frequency induction. In particular, the portion, around the primary pipe 1, of the heating coil 13 is wound to form a three-dimensional curve in parallel to the welding line whereas the portion around the pipe base 2 is wound to form a two-dimensional curve in concentric relationship to the pipe base 2. FIG. 15 is a cross-sectional view taken along the plane including an axis of the primary pipe 1 and an axis of the pipe base 2 shown in FIG. 14 in the Y-direction. FIG. 16 is a cross-sectional view taken along the plane in the X-direction in the same manner. In such a winding manner of the coil, the arrangement makes it difficult to heat the hatched region 15 shown in FIG. 15 and hence to raise a temperature on the pipe outer surface.

Figure 17:
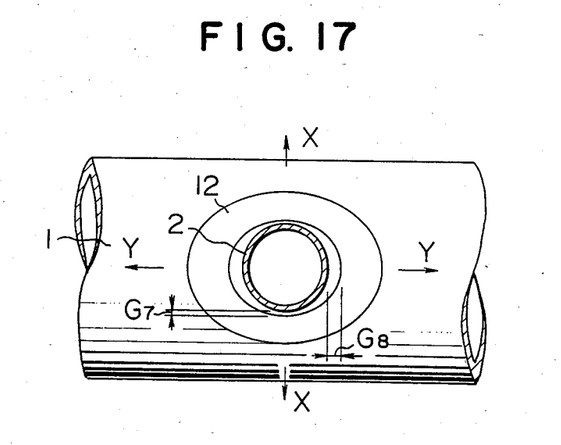
FIG. 17 is an illustration of an embodiment of the invention in which the coil is made into an ellipse form.

FIG. 17 shows an embodiment to which the invention is applied on the basis of the foregoing studies. A coil 13 is wound to form an ellipse with a long axis thereof being aligned with the axial direction of the primary pipe 1 so that a spacing $G_7$, in the X-direction, between the coil 13 and the pipe base 2 is gradually smaller than a spacing $G_8$ in the Y-direction. Accordingly, since the spacing where it is difficult to raise a temperature is narrowed, it is possible to keep the temperature distribution as a whole substantially uniform.

Figure 18:
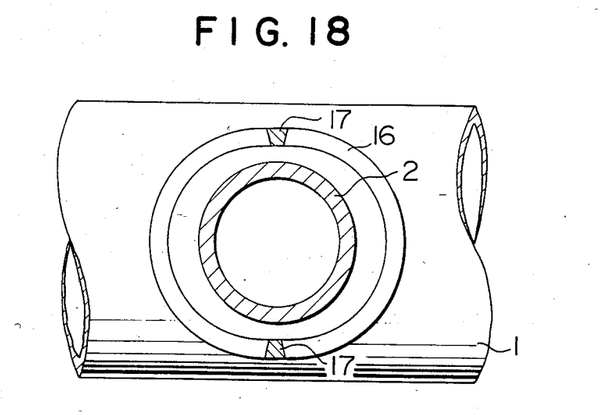
FIGS. 18 and 19 are illustratings of another embodiment of the invention in which adapters are inserted into divided portions of the coil.
Figures 19, 20:
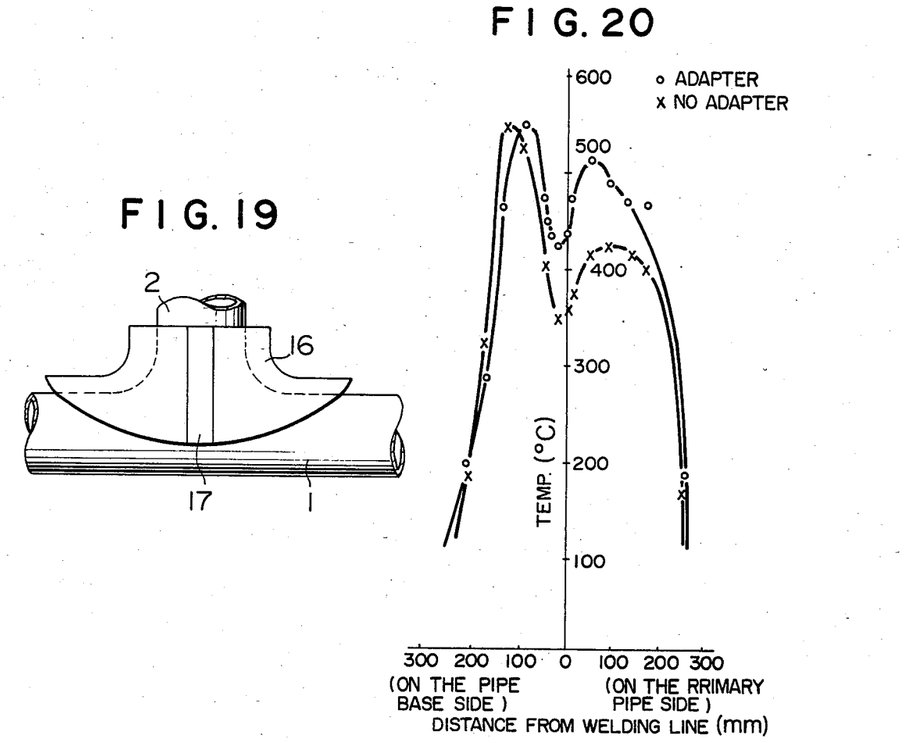
FIG. 20 is a graph showing a comparison of the case where the adapters, shown in FIG. 18, are provided, with the case where no adapters are provided, in temperature distribution in the pipe outer surface.

Another embodiment in which a countermeasure for removal of the temperature distribution nonuniformity encountered with the arrangement shown in FIG. 15 is intended to use will be explained with reference to FIGS. 18 through 20. In FIGS. 18 and 19, a heating coil 16 is divided into two halves and adapters 17 which are made of same material as the coil 16 or conductive material are inserted into their divided portions. It is preferable that the adapters 17 are in the form of wedges each having tapered portions. This embodiment is essentially similar to the case where the coil is wound to form an ellipse as explained with reference to FIGS. 13 or 17. In this embodiment, various types of adapters 17 are prepared in different sizes, and a flexible interchangeability that adapters 17 may be freely interchanged with one another in compliance with particular conditions such as a heating temperature, coil sizes and the like is available. A comparison of the case where the adapters 17 are inserted into the coil gaps thereby adjusting the spacings between the coil 16 and the pipe base 2 with the case where no adapters are used is shown in FIG. 20. In FIG. 20, the abscissa represents a distance from the welding line to the primary pipe 1 side and the pipe base 2 side and the ordinate represents a temperature at each pipe outer surface. As is apparent from FIG. 20, nonuniformity in temperature distribution on the pipe outer surface is eliminated much better in the case of the adapter provision than in the case where no adapters are used. It is a matter of course that substantially the same effect may be obtained through any method in which the conductive members or welded materials are formed on the inside of the coil as shown in FIG. 6 or the external force is applied to the particular portions as shown in FIG. 9.

According to the present invention, since the spacings between the heating coil to be attached to the pipe and the outer surfaces of the pipe are changed in accordance with the difference in configuration of the heating coil, even if the configuration of the coil is changed in any particular point, a uniform temperature distribution may be obtained in the pipings.

What is claimed is:

1. A method of uniformly heating a piping arrangement for preventing stress-corrosion cracking at a welded portion of the piping arrangement, comprising:
providing a pipe with coolant and heating an outer surface of said pipe by attaching an induction heating coil of relatively large diameter including a stepped portion connecting adjacent turns of the coil, said adjacent turns respectively having turn ends bent in opposite directions and connected together to define the stepped portion and form a single coil from the turns so that current flowing in the coil is abruptly changed at the stepped portion to weaken the induction heating at the stepped portion relative to the remainder of the coil, thereby generating a temperature difference between an inner surface and said outer surface of said pipe, and simultaneously maintaining a spacing defined between said outer surface of said pipe and said heating coil that is smaller at said stepped portion than in the vicinity of said stepped portion to correspondingly maintain said heating and generating uniform.

2. The method according to claim 1, wherein said maintaining includes providing a conductive member attached to an inside of said heating coil between said outer surface of said pipe and said heating coil, thereby changing said spacing.

3. The method according to claim 1, wherein said step of maintaining includes providing a conductive welded material formed on an inside of said heating coil, thereby changing said spacing.

4. The method according to claim 1, wherein said step of maintaining applies an external force to said heating coil, thereby changing said spacing.

5. In a method of heating a piping arrangement for preventing stress-corrosion cracking at a welded portion between a primary pipe and a pipe base by providing said primary pipe and pipe base with coolant therein and heating each outer surface of said primary pipe and said pipe base by a heating coil having stepped portions, thereby generating a temperature difference between said outer surface and each inner surface of said piping arrangment, said step of heating the piping arrangement comprising the following steps of:

winding said heating coil around said outer surface of said primary pipe substantially in parallel to said welded portion from said welded portion to the primary pipe side;

winding said heating coil around said outer surface of said pipe base substantially perpendicular to an axis of said pipe base from said welded portion to the pipe base side;

forming a portion of said coil wound around said primary pipe and a portion of said coil wound around said pipe base substantially in an ellipse with a long axis of said ellipse being aligned with an axis of said primary pipe so that spacing between said outer surfaces and said heating coil is smaller at said stepped portions than the other coil portion; and uniformly heating said primary pipe and said pipe base by said coil.

6. In a method of heating a piping arrangment for preventing stress-corrosion cracking at a welded portion between a primary pipe and a pipe base by providing said primary pipe and a pipe base with coolant and heating each outer surface of said primary pipe and said pipe base by a heating coil, thereby generating a temperature difference between said outer surface and each inner surface of said piping arrangement, a method of heating the piping arrangement comprising the following steps of: winding said heating coil around said outer surfaces of said primary pipe and said base substantially in parallel to said welded portion and forming stepped portions;

forming said heating coil into an ellipse with a long axis of said ellipse being aligned with an axis of said primary pipe so that spacing between said outer surfaces and said heating coil is smaller at said stepped portions than the other coil portion; and uniformly heating said primary pipe and said pipe base by said coil.

7. A method of heating a pipeing arrangement for preventing stress-corrosion cracking at a welded portion, comprising providing a primary pipe and a pipe base welded at said welded portion;

providing said primary pipe and a pipe base with coolant inside;

heating each outer surface of said primary pipe and said pipe base by a heating coil including a stepped portion;

thereby generating a temperature difference between said outer surface and each inner surface of said piping arrangement;

winding said heating coil around said outer surfaces of said primary pipe and said pipe base while forming said stepped portions in the midway of said heating coil; and making smaller a spacing between said coil and each outer surface of said primary pipe and between said coil and each outer surface of said pipe base at each of said stepped portions than at the other coil portions.

8. The method according to claim 7, wherein steps of winding and making are conducted so that said coil is wound around said pipe base in an eccentric manner to thereby make said spacing smaller.

9. The method according to claim 7, wherein said step of making includes providing a conductive member attached to an inside of said heating coil between said outer surface of said primary pipe and said pipe base and said heating coil to thereby make said spacing smaller.

10. The method according to claim 7, wherein said step of making includes providing a conductive welded material on an inside of said coil.

11. A piping heating arrangement comprising a pipe having a welded portion and being provided therein with coolant; means for heating an outer surface of the pipe to thereby generate a temperature difference between said outer surface and an inner surface of the pipe, and for preventing a stress-corrosion cracking at the welded portion of the pipe; and said means comprising an induction heating coil of relatively large diameter provided with stepped portions in the midway thereof connecting adjacent turns of the coil, said adjacent turns respectively having turn ends bent in opposite directions and connected together to define the stepped portion and form a single coil from the turns so that current flowing in the coil is abruptly changed at the stepped portion to weaken the induction heating at the stepped portion relative to the remainder of the coil, and said stepped portion being wound along said welded portion so that the spacing between said coil and said outer surface of the pipe is smaller at said stepped portions than at the other coil portions.

12. The device according to claim 11, wherein said means includes a conductive member for changing said spacing attached to said other coil portions, to be confronted with the outer surface of said pipe.

13. The heating coil according to claim 11, wherein said means includes a welded material formed on an inside of said heating coil to thereby change said spacing.

* * * * *